US011381323B1

(12) United States Patent
Nilsson et al.

(10) Patent No.: US 11,381,323 B1
(45) Date of Patent: Jul. 5, 2022

(54) TELEMATICS VERIFICATION SYSTEM UTILIZING A WIRELESS CABLE SHIELDING COVER

(71) Applicant: Volvo Car Corporation, Gothenburg (SE)

(72) Inventors: Mikael Nilsson, Gothenburg (SE); Fredrik Tufvesson, Gothenburg (SE); Christian Lötbäck, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 17/367,813

(22) Filed: Jul. 6, 2021

(51) Int. Cl.
*H04B 17/15* (2015.01)
*H04B 1/3822* (2015.01)
*H04B 17/29* (2015.01)

(52) U.S. Cl.
CPC .......... *H04B 17/15* (2015.01); *H04B 1/3822* (2013.01); *H04B 17/29* (2015.01)

(58) Field of Classification Search
CPC ...................................................... H04B 17/15
See application file for complete search history.

(56) References Cited

U.S. PATENT DOCUMENTS

| 6,509,878 | B1 * | 1/2003 | Tornatta, Jr. ......... | H01Q 1/3275 343/715 |
| 7,392,013 | B2 | 6/2008 | Chadwick et al. | |
| 2009/0047929 | A1 * | 2/2009 | Chesnutt ................. | H04L 51/38 455/411 |
| 2016/0169699 | A1 * | 6/2016 | Sol ...................... | G06F 16/5866 701/428 |
| 2017/0012714 | A1 | 1/2017 | Kildal | |
| 2018/0260500 | A1 * | 9/2018 | Hati ....................... | H04L 41/145 |
| 2019/0239118 | A1 | 8/2019 | Baghel et al. | |
| 2020/0245165 | A1 | 7/2020 | Nilsson et al. | |

FOREIGN PATENT DOCUMENTS

| CN | 201158365 Y | 12/2008 |
| CN | 104442327 A | 3/2015 |
| CN | 110907738 A | 3/2020 |

OTHER PUBLICATIONS

Dibaei et al., Attacks and Defences On Intelligent Connected Vehicles: A Survey, Digital Communications and Networks, vol. 6, Issue 4, Nov. 2020, pp. 399-421.

\* cited by examiner

*Primary Examiner* — Hsinchun Liao
(74) *Attorney, Agent, or Firm* — Clements Bernard Walker; Christopher L. Bernard

(57) ABSTRACT

A telematics verification system for the testing of a vehicle telematics system, including: a conductive ground plate adapted to be disposed under a vehicle when testing the vehicle telematics system using the telematics verification system; a conductive cover adapted to be disposed over and about an exterior surface of the vehicle and an antenna of the vehicle when testing the vehicle telematics system using the telematics verification system; a downlink antenna adapted to be arranged inside the conductive cover, wherein the downlink antenna is configured to wirelessly transmit a downlink signal inside the conductive cover, wherein the downlink signal is wirelessly receivable by the antenna of the vehicle; and an uplink antenna adapted to be arranged inside the conductive cover, wherein the uplink antenna is configured to wirelessly receive an uplink signal inside the conductive cover, wherein the uplink signal is wirelessly receivable from the antenna of the vehicle.

20 Claims, 10 Drawing Sheets

TELEMATICS VERIFICATION SYSTEM UTILIZING A WIRELESS CABLE SHIELDING COVER

TECHNICAL FIELD

The present disclosure relates generally to the automotive field. More particularly, the present disclosure relates to a telematics verification system for the testing of a vehicle telematics system.

BACKGROUND

Vehicle telematics is a relatively broad field that encompasses telecommunications and informatics for applications in road vehicles. Other illustrative applications include cellular technology and wireless local area networks (WLANs).

In general, it is desirable to test telematics systems in order to evaluate the communications links in the telematics systems before they are released to the market. The testing of the communications links of a telematics system of a vehicle requires a controlled environment with little or no radio interference. Conventionally, this may be achieved by testing the telematics system before it is installed in a vehicle or by removing the telematics system from the vehicle and placing it in a shielded environment. However, in such cases, the telematics system is isolated from the other electronics systems of the vehicle and thus a realistic testing environment for the telematics system is not provided.

Another conventional option is to place the vehicle, including the telematics system, inside a shielded room or an anechoic chamber. However, such shielded rooms or anechoic chambers are costly to implement.

Accordingly, there is a need for a simple and inexpensive testing system for the testing of vehicle telematics systems that provides a realistic and effective testing environment.

SUMMARY

The present disclosure provides a telematics verification system for the testing of a vehicle telematics system. This telematics verification system provides a simple and inexpensive means for the verification of vehicle telematics systems that enables testing during more realistic situations as compared to having a vehicle inside a shielded room or an anechoic chamber.

In one illustrative embodiment, the present disclosure provides an electromagnetically shielded compartment or box that is adapted to be arranged to cover antennas of the telematics unit of the vehicle for testing the vehicle telematics system while the vehicle is operative. Downlink antennas of the telematics verification system are arrangeable inside the electromagnetically shielded compartment and may thereby wirelessly transmit a downlink signal inside the electromagnetically shielded compartment.

Advantageously, the electromagnetically shielded compartment is arrangeable on the exterior surface of the vehicle, to cover the vehicle antennas. Thereby, the vehicle can operate in a test rig, climate chamber, or in realistic environments, such as in cities, in urban environments, or more remote countryside environments, at the same time as testing of the telematics system inside the electromagnetically shielded compartment is carried out.

Furthermore, in order to be able to also provide an uplink connection, an uplink antenna is provided and is adapted to be arranged inside the electromagnetically shielded compartment. The uplink antenna is adapted to receive uplink signals transmitted by the antennas of the vehicle. In other words, embodiments of the present disclosure provide for the complete testing of a two-way communications system in a realistic environment, such as when operating the vehicle on a road or operating the vehicle at a test facility.

Accordingly, in a first aspect, there is provided a telematics verification system for the testing of a vehicle telematics system, the telematics verification system including: an electromagnetically shielded compartment adapted to be arranged to cover antennas of a vehicle when testing the vehicle telematics system using the telematics verification system while operating the vehicle.

The telematics verification system also includes a set of downlink antennas adapted to be arranged inside the electromagnetically shielded compartment, the set of downlink antennas configured to wirelessly transmit a downlink signal inside the electromagnetically shielded compartment, wherein the signal indicative of the downlink signal is wirelessly receivable by the antennas of the vehicle.

Further, the telematics verification system includes an uplink antenna adapted to be arranged inside the electromagnetically shielded compartment, the uplink antenna adapted to wirelessly receive uplink signals transmitted by the antennas of the vehicle.

Advantageously, the electromagnetically shielded compartment is adapted to remain mounted on the vehicle for testing the vehicle telematics system using the telematics verification system while operating the vehicle. Further, this enables the testing of the vehicle telematics system at the same time as testing other functions and systems of the vehicle that may require realistic testing environments.

The electromagnetically shielded compartment may be defined by a box made from a suitable material, such as a metal.

According to a second aspect, there is provided a method for performing the verification of a vehicle telematics system, the method including: providing a telematics verification system including an electromagnetically shielded compartment; arranging the electrically shielded compartment on a vehicle so that the electrically shielded compartment covers antennas of the vehicle; transmitting a downlink signal from a set of downlink antennas arranged in the electromagnetically shielded compartment, wherein a signal indicative of the downlink signal is wirelessly received by the vehicle antennas; and evaluating the signal received by the vehicle antenna. Advantageously, this provides for at least evaluating the downlink communication link of the telematics system.

In another illustrative embodiment, the present disclosure provides a telematics verification system for the testing of a vehicle telematics system, the telematics verification system including: a conductive ground plate adapted to be disposed under a vehicle when testing the vehicle telematics system using the telematics verification system; a conductive cover adapted to be disposed over and about an exterior surface of the vehicle and an antenna of the vehicle when testing the vehicle telematics system using the telematics verification system; a downlink antenna adapted to be arranged inside the conductive cover, wherein the downlink antenna is configured to wirelessly transmit a downlink signal inside the conductive cover, wherein the downlink signal is wirelessly receivable by the antenna of the vehicle; and an uplink antenna adapted to be arranged inside the conductive cover, wherein the uplink antenna is configured to wirelessly receive an uplink signal inside the conductive cover, wherein the uplink signal is wirelessly receivable from the antenna of the vehicle. The conductive cover is manufactured from a flexible material such that the conductive cover conforms to the exterior surface of the vehicle and one or more of the antenna of the vehicle, the downlink antenna, the uplink antenna, and a support structure coupled to one or more of the uplink antenna and the downlink antenna. A lower portion of the conductive cover makes contact with an upper surface of the conductive ground plate around an external periphery of the vehicle, thereby creating a complete shielding environment for the entire vehicle. Optionally, the telematics verification system further includes a compartment structure disposed about the antenna of the vehicle and coupled to the exterior surface of the vehicle inside the conductive cover, wherein the downlink antenna and the uplink antenna are both coupled to an interior surface of the compartment structure. Alternatively, the telematics verification system further includes one or more fixture structures disposed adjacent to the antenna of the vehicle and coupled to the exterior surface of the vehicle inside the conductive cover, wherein the downlink antenna and the uplink antenna are coupled to one or more of the one or more fixture structures. Optionally, an additional antenna of the vehicle is disposed inside the conductive cover when testing the vehicle telematics system using the telematics verification system, and the telematics verification system further includes: an additional downlink antenna adapted to be arranged inside the conductive cover, wherein the additional downlink antenna is configured to wirelessly transmit an additional downlink signal inside the conductive cover, wherein the additional downlink signal is wirelessly receivable by the additional antenna of the vehicle; and an additional uplink antenna adapted to be arranged inside the conductive cover, wherein the additional uplink antenna is configured to wirelessly receive an additional uplink signal inside the conductive cover, wherein the additional uplink signal is wirelessly receivable from the additional antenna of the vehicle. The conductive ground plate is adapted to be disposed under the vehicle and the conductive cover is adapted to be disposed over and about the exterior surface of the vehicle and the antenna of the vehicle when testing the vehicle telematics system using the telematics verification system while the vehicle is operating.

In a further illustrative embodiment, the present disclosure provides a telematics verification system for the testing of a vehicle telematics system, the telematics verification system including: a conductive ground plate adapted to be disposed under a vehicle when testing the vehicle telematics system using the telematics verification system; a conductive cover adapted to be disposed over and about an exterior surface of the vehicle and an antenna of the vehicle when testing the vehicle telematics system using the telematics verification system; a downlink antenna adapted to be arranged inside the conductive cover, wherein the downlink antenna is configured to wirelessly transmit a downlink signal inside the conductive cover, wherein the downlink signal is wirelessly receivable by the antenna of the vehicle; an uplink antenna adapted to be arranged inside the conductive cover, wherein the uplink antenna is configured to wirelessly receive an uplink signal inside the conductive cover, wherein the uplink signal is wirelessly receivable from the antenna of the vehicle; and a support structure adapted to be arranged inside the conductive cover, wherein the downlink antenna and the uplink antenna are both coupled to the support structure. The conductive cover is manufactured from a flexible material such that the conductive cover conforms to the exterior surface of the vehicle and one or more of the antenna of the vehicle, the downlink antenna, the uplink antenna, and the support structure coupled to the uplink antenna and the downlink antenna. A lower portion of the conductive cover makes contact with an upper surface of the conductive ground plate around an external periphery of the vehicle, thereby creating a complete shielding environment for the entire vehicle. Optionally, the support structure includes a compartment structure disposed about the antenna of the vehicle and coupled to the exterior surface of the vehicle inside the conductive cover, wherein the downlink antenna and the uplink antenna are both coupled to an interior surface of the compartment structure. Alternatively, the support structure includes one or more fixture structures disposed adjacent to the antenna of the vehicle and coupled to the exterior surface of the vehicle inside the conductive cover, wherein the downlink antenna and the uplink antenna are coupled to one or more of the one or more fixture structures. Optionally, an additional antenna of the vehicle is disposed inside the conductive cover when testing the vehicle telematics system using the telematics verification system, and the telematics verification system further includes: an additional downlink antenna adapted to be arranged inside the conductive cover, wherein the additional downlink antenna is configured to wirelessly transmit an additional downlink signal inside the conductive cover, wherein the additional downlink signal is wirelessly receivable by the additional antenna of the vehicle; and an additional uplink antenna adapted to be arranged inside the conductive cover, wherein the additional uplink antenna is configured to wirelessly receive an additional uplink signal inside the conductive cover, wherein the additional uplink signal is wirelessly receivable from the additional antenna of the vehicle. The conductive ground plate is adapted to be disposed under the vehicle and the conductive cover is adapted to be disposed over and about the exterior surface of the vehicle and the antenna of the vehicle when testing the vehicle telematics system using the telematics verification system while the vehicle is operating.

In a further illustrative embodiment, the present disclosure provides a telematics verification method for the testing of a vehicle telematics system, the telematics verification method including: disposing a conductive ground plate under a vehicle when testing the vehicle telematics system using the telematics verification system; disposing a conductive cover over and about an exterior surface of the vehicle and an antenna of the vehicle when testing the vehicle telematics system using the telematics verification system; arranging a downlink antenna inside the conductive cover, wherein the downlink antenna is configured to wirelessly transmit a downlink signal inside the conductive cover, wherein the downlink signal is wirelessly receivable by the antenna of the vehicle; and arranging an uplink antenna inside the conductive cover, wherein the uplink antenna is configured to wirelessly receive an uplink signal inside the conductive cover, wherein the uplink signal is wirelessly receivable from the antenna of the vehicle. The conductive cover is manufactured from a flexible material such that the conductive cover conforms to the exterior surface of the vehicle and one or more of the antenna of the vehicle, the downlink antenna, the uplink antenna, and a support structure coupled to one or more of the uplink antenna and the downlink antenna. A lower portion of the conductive cover makes contact with an upper surface of the conductive ground plate around an external periphery of the vehicle, thereby creating a complete shielding environment for the entire vehicle. Optionally, the telematics verification method further includes providing a compartment structure disposed about the antenna of the vehicle and coupled to the exterior surface of the vehicle inside the conductive cover, wherein the downlink antenna and the uplink antenna are both coupled to an interior surface of the compartment structure. Alternatively, the telematics verification method further includes providing one or more fixture structures disposed adjacent to the antenna of the vehicle and coupled to the exterior surface of the vehicle inside the conductive cover, wherein the downlink antenna and the uplink antenna are coupled to one or more of the one or more fixture structures. The telematics verification method further includes testing the vehicle telematics system using the telematics verification system while the vehicle is operating.

Further features and advantages of the present disclosure will become apparent when studying the appended claims and the following description. The skilled person will realize that different features of the present disclosure may be combined to create embodiments other than those specifically described in the following, without departing from the scope of the present disclosure.

BRIEF DESCRIPTION OF THE DRAWINGS

These and other aspects of the present disclosure will now be described in more detail, with reference to the appended drawings showing illustrative embodiments of the present disclosure, wherein.

DETAILED DESCRIPTION

Figure 1:
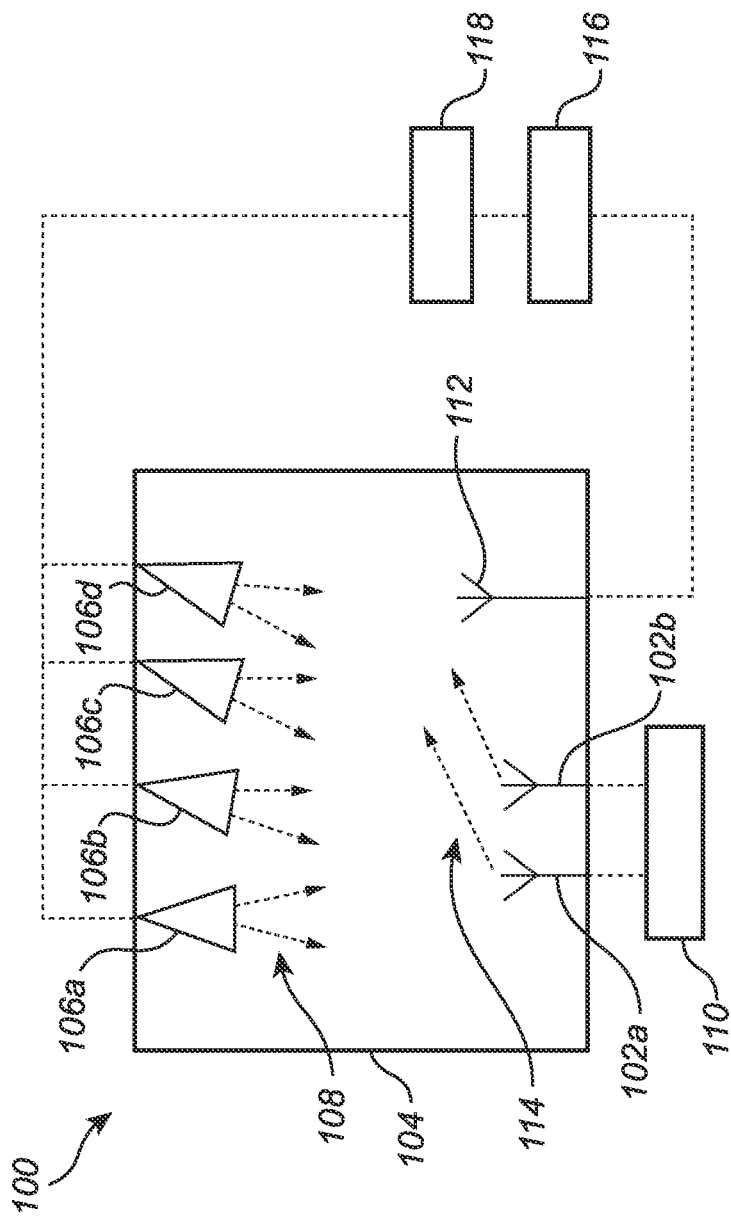
FIG. 1 conceptually illustrates the telematics verification system according to an illustrative embodiment of the present disclosure.

In the present detailed description, various illustrative embodiments of the telematics verification system according to the present disclosure are described. However, the present disclosure may be embodied in many different forms and should not be construed as limited to the illustrative embodiments set forth herein; rather, these illustrative embodiments are provided for thoroughness and completeness, and fully convey the scope of the present disclosure to the skilled person. Like reference characters refer to like elements throughout.

FIG. 1 conceptually illustrates an example telematics verification system 100 according to embodiments of the present disclosure. The telematics verification system 100 is configured for testing of a vehicle telematics system including antennas 102a and 102b. The antennas 102a and 102b may be configured for wireless communication using e.g. 2G, 3G, 4G, 5G, or WLAN network technology, such as the family of wireless 802.11 standards and may be used for reception and transmission of broadband signals. Specifically, it can also be configured for GPS or wireless vehicular communication standards such as DSRC, ITS-G5, or cellular-ITS solutions.

The telematics verification system 100 includes an electromagnetically shielded compartment 104 provided as a shielded box adapted to cover antennas 102a and 102b of the vehicle. The electromagnetically shielded compartment 104 has necessary input opening(s) for the insertion of the antennas 102a and 102b into the inside of the electromagnetically shielded compartment 104.

A set of downlink antennas 106a-d are adapted to be arranged inside the electromagnetically shielded compartment 104. The set of downlink antennas 106a-d are configured to transmit downlink signals 108 inside the electromagnetically shielded compartment 104. The downlink signals 108 are wirelessly receivable by the vehicle antennas 102a and 102b. Thus, for the testing of downlink transmission, i.e. the transmission of wireless signals to the vehicle telematics system, downlink signals 108 are transmitted by the downlink antennas 106a-d, and subsequently received by the vehicle antennas 102a and 102b. A telematics control unit 110 connected to the vehicle antennas 102a and 102b is configured to evaluate the received signal.

Accordingly, the downlink connection may advantageously be tested in the electromagnetically shielded environment provided by the electromagnetically shielded compartment 104.

Furthermore, an uplink antenna 112 is provided and is adapted to be arranged inside the electromagnetically shielded compartment 104. The uplink antenna 112 is adapted to receive uplink signals 114 transmitted by the antennas 102a and 102b of the vehicle.

Accordingly, the uplink connection may also advantageously be tested in the electromagnetically shielded environment provided by the electromagnetically shielded compartment 104.

A control unit 110 connected to the vehicle antennas 102a and 102b is configured to evaluate the received signal.

Embodiments of the present disclosure are based on the realization to provide the electromagnetically shielded environment required for verification of the vehicle telematics system in the form of an electromagnetically shielded compartment which is arrangeable on the vehicle to cover the antennas of the vehicle. This enables to test the vehicle telematics system while operating with the vehicle and operating other systems of the vehicle under realistic conditions, i.e. travelling in real world driving conditions in live traffic or in test rigs and climate chambers, or even in a regular garage.

Further, the embodiments of the present disclosure enable using the so-called wireless cable method for the testing of the vehicle telematics system in realistic environments. The wireless cable method is defined by the wireless transmission of the downlink and uplink signals for testing of a multiple input multiple output (MIMO) system, i.e. a system which has several input channels and several output channels, such as the antennas 102a and 102b of the vehicle.

The electromagnetically shielded compartment 104 has necessary feed-through connections for communication cables to e.g. antennas 106a-d and 112.

The downlink antennas 106a-d may be configured to receive the downlink signals from a signal emulator, which may be provided in the form of a fading emulator 118. Thus, the downlink antennas 106a-d are connected to the output ports of the fading emulator 118. The operation of a fading emulator 118 is known per se to the skilled person and will not be described in detail herein. Generally, a fading emulator is configured to perform convolution between an originally transmitted signal and a secondary function, for example a function to emulate different radio propagation environments, and emulate noise, electromagnetic interference, or internal disturbance generated by the vehicle in order to create a realistic signal including e.g. noise. Further, the fading emulator 118 may be configured to phase or amplitude tune the downlink signals so that a specific channel associated with a specific antenna of the vehicle telematics system can be tested. The number of downlink antennas is preferably equal to or exceeds the number of antennas of the vehicle.

The fading emulator 118 may be comprised in the telematics verification system 100.

A communications tester 116 is here schematically illustrated as a box. The communications tester 116 provides a signal source in the form of e.g. a base station simulator unit or a WLAN communications tester, depending on the type of communications technology that is the subject for verification.

The communications tester 116 is configured to provide the original transmitted signals to the signal emulator, e.g. provided as a fading emulator 118 configured to generate the downlink signals 108. Further, the communications tester 116 is connected to the uplink antenna 112 in order to receive and evaluate the signals received by the uplink antenna 112. The received signals are the uplink signals 114 transmitted by the vehicle antennas 102a and 102b. As mentioned above, the signal source may be provided in the form of base station simulator unit or a WLAN communications tester. In some embodiments the uplink antenna is connected to an external antenna to communicate with a true base station, as will be described below.

A base station simulator unit is advantageously configured to mimic a true base station. Thus, the base station simulator unit which mimics a true base station provides for testing of the uplink connection of the vehicle telematics systems in realistic environments despite the vehicle antennas 102a and 102b being shielded.

The communications tester 116 provided as a base station simulator unit or a WLAN communication tester may be comprised in the telematics verification system 100.

There may be further components included in the system 100, such as power amplifiers e.g. between the fading emulator and the downlink antennas. These further components are known and will not be discussed further herein.

The electromagnetically shielded compartment 104 is adapted to attenuate external radio signals to provide a controllable radio environment inside the compartment. Preferably, the external radio signals are significantly attenuated such that a controllable radio environment is provided inside the compartment even in realistic traffic situations when operating with the vehicle comprising the telematics system 100. The shielded box 104 may be made from a metal and may further be covered on the inside by attenuating material (so called radio absorbents) to attenuate reflections inside the box.

For use of the telematics verification system 100, the electromagnetically shielded compartment 104 provided as a shielded box may be placed inside the vehicle. The vehicle antennas may be removed from the normal mounting place on the vehicle and placed inside the box.

Figure 2:
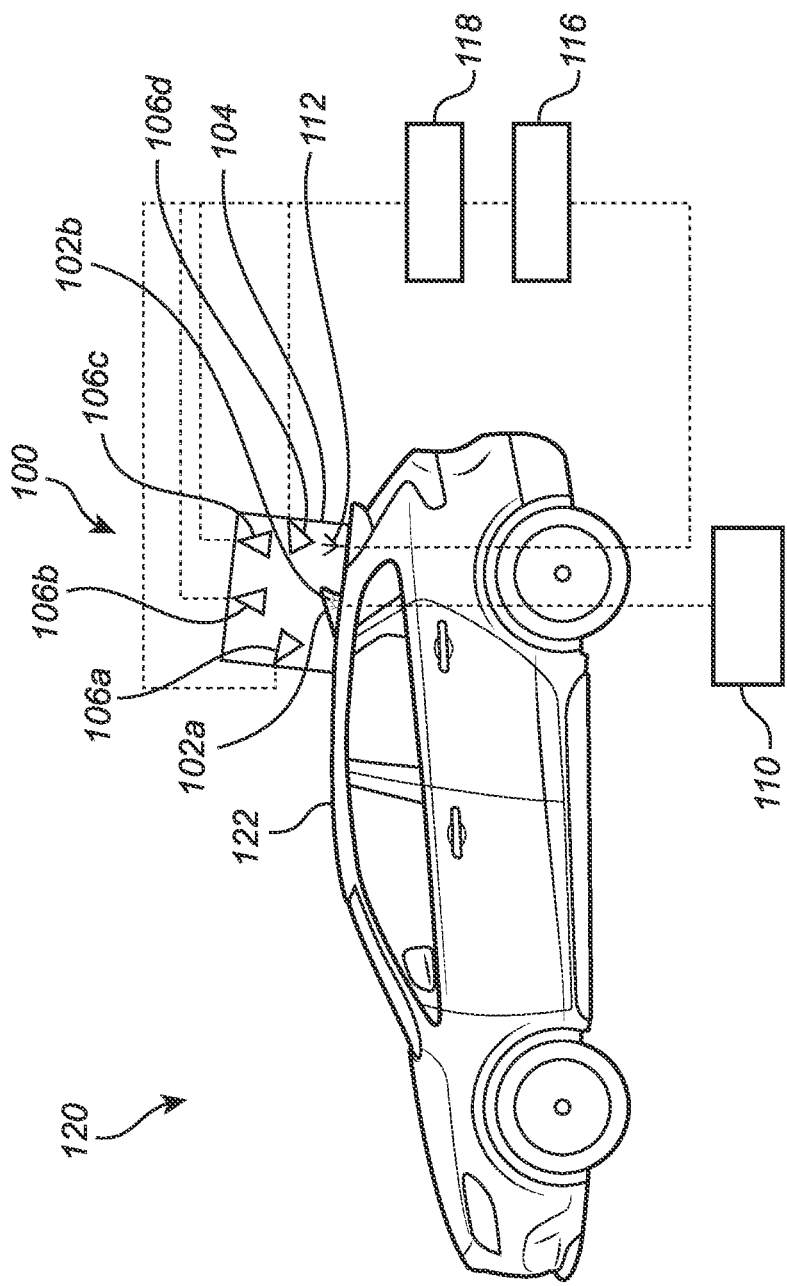
FIG. 2 conceptually illustrates the telematics verification system arranged on a vehicle according to an illustrative embodiment of the present disclosure.

FIG. 2 illustrates another advantageous possibility for using the telematics verification system 100. Here, the telematics verification system 100 is arranged on a vehicle 120. In this example illustrative implementation, the electromagnetically shielded compartment 104 is mounted to the vehicle roof 122 to cover the antennas 102a and 102b. As illustrated, the electromagnetically shielded compartment 104 also accommodates the downlink antennas 106a-d and the uplink antenna 112.

Accordingly, the electromagnetically shielded compartment 104 is advantageously fixedly mountable on the vehicle 120. In the presently described embodiment, the electromagnetically shielded compartment 104 is fixedly mountable on the vehicle roof 122 to thereby enclose the antennas 102a and 102b inside the electromagnetically shielded compartment 104.

The electromagnetically shielded compartment 104 is preferably adapted to remain mounted on the vehicle 120 for testing the vehicle telematics system using the telematics verification system 100 while operating the vehicle 120. In this way, the telematics system of the vehicle 120 may advantageously be tested while the vehicle 120 is operating and thereby able to use other sub-systems of the vehicle 120, such as electronic control systems in realistic traffic situations, or in a test rig, or a climate chamber, or in a garage. In other words, being able to mount the electromagnetically shielded compartment 104 on the vehicle 120 to enclose the vehicle antennas 102a and 102b provides for testing the vehicle telematics under truly realistic traffic situations while operating the vehicle 120.

Mounting the electromagnetically shielded compartment 104 on the vehicle 120 may be performed by bolting it to e.g. the vehicle roof 122.

The fading emulator 118 and the communications tester 116 (e.g. base station emulator or WLAN communications tester) are schematically shown outside the vehicle for clarity in the drawing, but in practical implementations they may be placed inside the vehicle 120.

Figure 3:
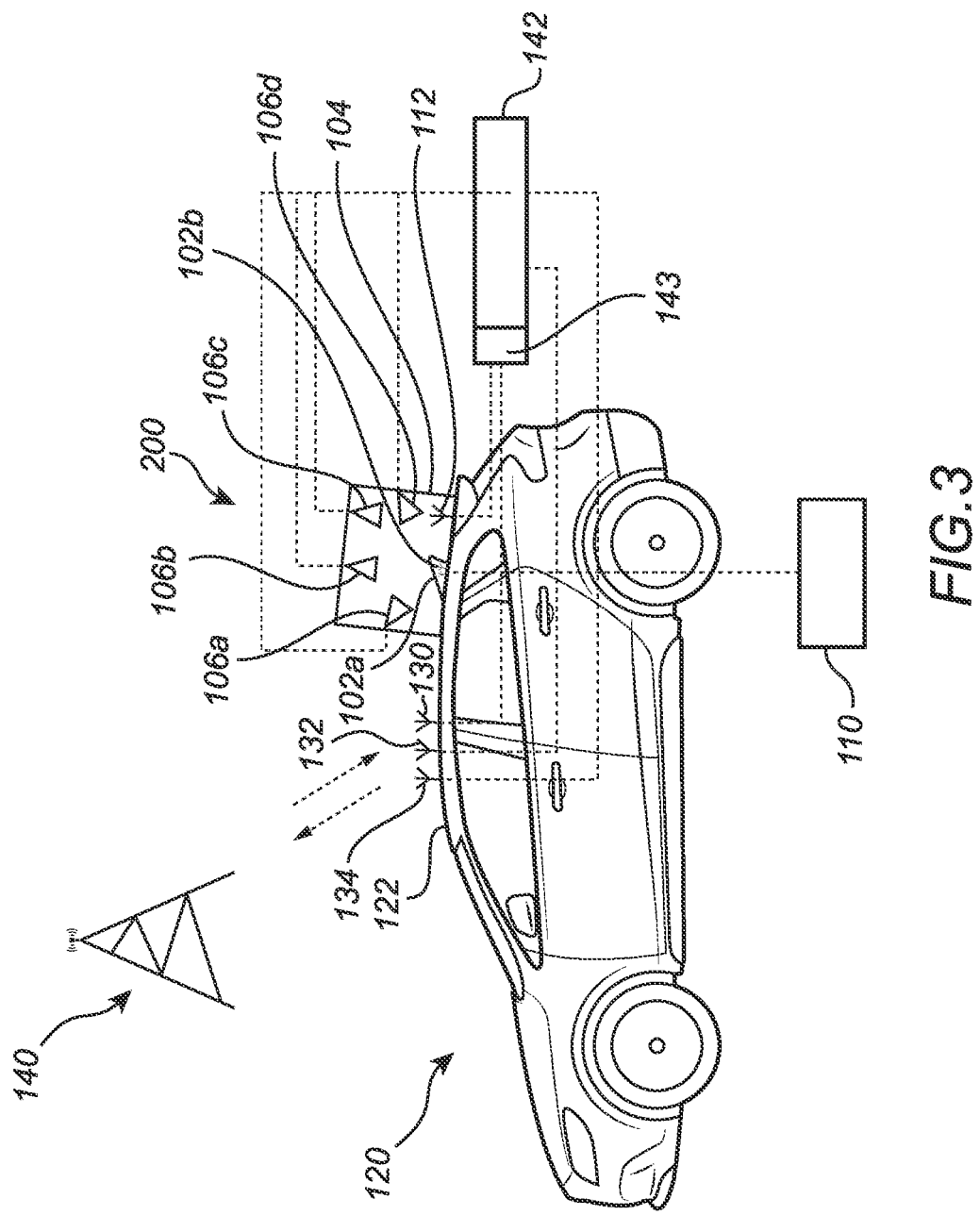
FIG. 3 conceptually illustrates another telematics verification system arranged on a vehicle according to another illustrative embodiment of the present disclosure.

FIG. 3 illustrates the telematics verification system 200 when arranged on a vehicle 120. The uplink antenna 112 is connected to an external antenna 130 via a converter unit 143 adapted to transmit the uplink signal to a communications network 140. The converter unit 143 may be comprised in the signal emulator 142 and may be configured to convert signals between different frequencies and/or network technologies. The signal emulator 142 is connected to a set of external antennas 132 and 134 adapted to receive transmitted signals from the communications network 140 and to provide the transmitted signals to the signal emulator 142.

Accordingly, in this example implementation, one of the antennas 130 is configured to transmit uplink signals that were originally transmitted by the vehicle antennas 102a and 102b and received by the uplink antenna 112 arranged in the shielded environment 104 to the communications network 140. A set of external receiving antennas 132 and 134 are configured to receive signals from the communications network 140 (e.g. a base station) and to provide them to the signal emulator 142.

With this setup, it is possible to test the telematics system of the vehicle 120 against the real world communications network e.g. connected to the cloud via a e.g. 2G, 3G, 4G, 5G, or WLAN network technology in real world radio environments. For example, it provides the possibility to emulate travelling with the vehicle 120 to different radio environments for testing of the telematics system.

In addition, the signal emulator 142 is configured to convert the received signal to a downlink signal at an arbitrary frequency and arbitrary wireless communication standard, for the downlink antennas 106a-d to transmit. In other words, it is possible to test real world signals at any frequency and any communications standard. This is inherently difficult to do with prior art systems since it may require shutting down or altering the public communications network.

Generally, a signal emulator comprises a dedicated receiver configured to receive signals from the external network via e.g. the antennas 132 and 134 for providing data to a base station emulator to be transmitted at an arbitrary frequency and arbitrary standard to the vehicle 120, and a dedicated transmitter configured to transmit signals to the external network 140 based on data received at an arbitrary frequency and arbitrary standard from the vehicle 120.

The signal emulator 142 may comprise a fading emulator. The signal emulator 142 may also comprise a communications tester.

Figure 4:
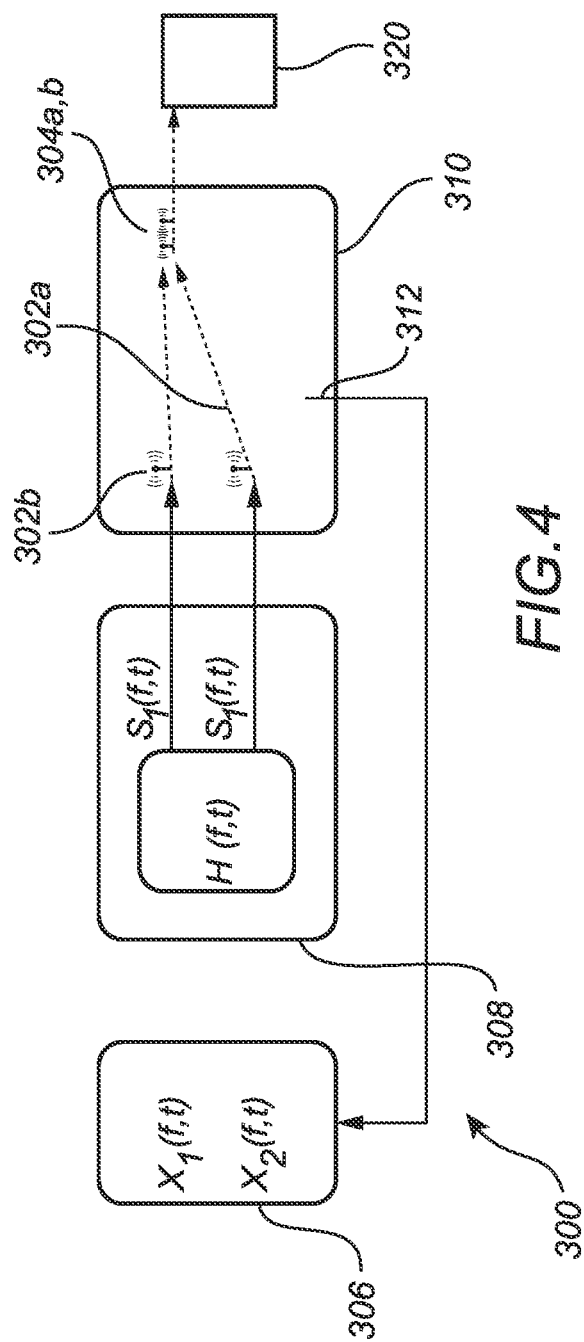
FIG. 4 is a flowchart of method steps according to an illustrative embodiment of the present disclosure, illustrating the overall general test (i.e. wireless cable) solution.

FIG. 4 is a schematic functional overview of an example telematics verification system according to the present disclosure. Here, the telematics verification system is shown as a 2 by 2 MIMO system, i.e. there are two downlink antennas 302a and 302b and two receiving and transmitting vehicle antennas 304a and 304b. A base station simulator unit 306 that emulates a wireless network end of the connection link is configured to provide the originally transmitted signals $x_1(f,t)$ and $x_2(f,t)$ to a fading emulator 308. The signals $x_1(f,t)$ and $x_2(f,t)$ are time and frequency variant.

The fading emulator 308 is configured to simulate how a real-world transmitter may behave. The fading emulator may thus add noise to the signals $x_1(f,t)$ and $x_2(f,t)$. For example, the fading emulator may apply a convolution to $x_1(f,t)$ and $x_2(f,t)$ in order to provide a faded representation of the original $x_1(f,t)$ and $x_2(f,t)$, here shown as $s_1(f,t)$ and $s_2(f,t)$. The convolution is here represented by the impulse response matrix H. The fading emulator may perform the convolution on the signals $x_1(f,t)$ and $x_2(f,t)$ with an impulse response that is based on measured antenna responses of the vehicle antennas 304a and 304b and the external propagation channel. This provides an emulated real-world radio signal inside the shielded environment provided by the environmentally shielded compartment 310. It is also possible to add noise and interference to the transmitted signals in order to make the test setup even more realistic.

In order to be able to individually test the channels of the telematics system, it is important to be able to transmit downlink signals from the downlink antennas 302a and 302b so that they are only received by one of the vehicle antennas 304a or 304b. For this, the fading emulator 306 may also be configured to apply a precoding scheme (i.e. suitable for MIMO communication networks) that may include controlling the phase and amplitude of the downlink signals to be tuned for a presently targeted antenna 304a or 304b. With knowledge of the characteristics of the antennas 304a and 304b, and the propagation channel within the shielded box, it is possible to tune the amplitudes and phases of the downlink signals so that e.g. the sum of the signals equals zero at one of the antennas 304a or 304b and the specifically generated faded signal is only received by the other antenna of 304b or 304b.

The above described precoding scheme is often referred to as a so-called zero-forcing scheme. Zero-forcing and other precoding schemes are per se known techniques and will not be described in further detail herein. For example, spatial multiplexing may be used where each of the vehicle antennas uses channel estimation techniques to separate the signals from the different downlink antennas 302a and 302b.

FIG. 4 further conceptually illustrates an uplink antenna 312 connected to the base station simulator 306. There is further shown telematics control unit 320 connected to the vehicle antennas 304a and 304b.

Figure 5:
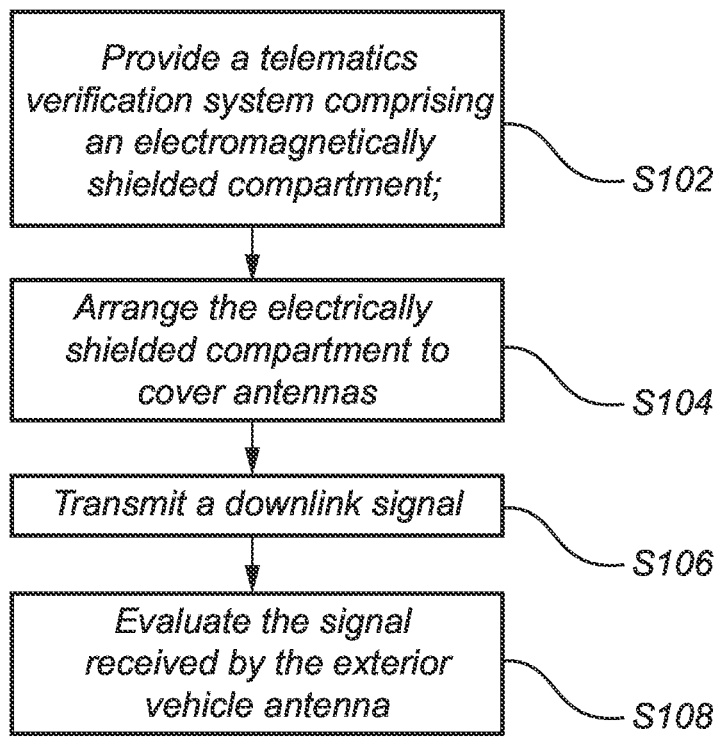
FIG. 5 is another flowchart of downlink method steps according to an illustrative embodiment of the present disclosure.

FIG. 5 is a flowchart of method steps according to embodiments of the present disclosure. The method steps are provided for performing verification of a vehicle telematics system. In step S102 is a telematics verification system provided comprising an electromagnetically shielded compartment. The electrically shielded compartment is arranged on a vehicle so that the electrically shielded compartment covers antennas of the vehicle in step S104. Further, in step S106, transmitting a downlink signal from a set of downlink antennas arranged in the electromagnetically shielded compartment. A signal indicative of the downlink signal is wirelessly received by the vehicle antennas. Subsequently, evaluating S108 the signal received by the vehicle antenna.

The steps of transmitting downlink signals and evaluating the received signals may be performed by a control unit.

Figure 6:
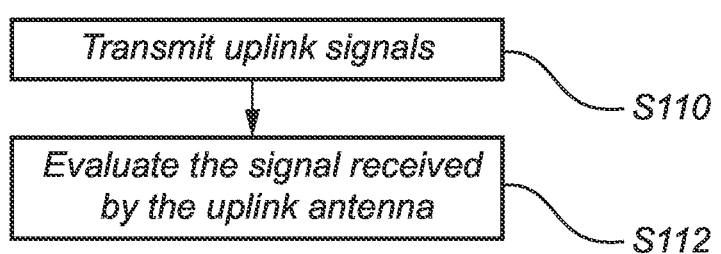
FIG. 6 is a further flowchart of uplink method steps according to an illustrative embodiment of the present disclosure.

FIG. 6 is a flowchart of method steps according to further embodiments of the present disclosure. Subsequently, in step S110 uplink signals are transmitted using the vehicle antennas. The uplink signal is receivable by an uplink antenna arranged inside electromagnetically shielded compartment. Next is to evaluate S112 the signal received by the uplink antenna.

The steps of transmitting uplink signals and evaluating the received signals may be performed by a control unit.

The term "uplink" is intended to also cover the commonly used term "upstream" and the term "downlink" is intended to also cover the commonly used term "downstream," where upstream and downstream are often used in e.g. WLAN and Wi-Fi systems.

The connections between the downlink antennas and the signal emulator, between the fading emulator and the communication tester, and between the uplink antenna and the communication tester may be provided by coaxial cables.

The control unit may include a microprocessor, microcontroller, programmable digital signal processor (DSP), or another programmable device, as well as be embedded into the vehicle/powertrain control logic/hardware. The control unit may also, or instead, include an application-specific integrated circuit (ASIC), a programmable gate array or programmable array logic, a programmable logic device, or a DSP. Where the control unit includes a programmable device, such as the microprocessor, microcontroller, or programmable DSP mentioned above, the processor may further include computer executable code that controls operation of the programmable device stored in a memory on a non-transitory computer readable medium.

Thus, in view of the above, it is clear that the wireless cable approach for the over-the-air testing of mobile phones and the like is well established in the market, using shielded chamber testing. However, such shielded chambers must be tailored for vehicle applications, and may be costly and cumbersome in whole-vehicle applications. The present disclosure has provided placing a metal box over a vehicle antenna. In some cases, however, this may result in insufficient shielding or may be limited to one position and antenna module. Further, it may require a flat surface on which the box may be placed, and often does not include the interference impacts from other car electronics. Accordingly, the present disclosure also provides a setup that utilizes a flexible whole-vehicle conductive shielding cover and conductive shielding ground plate on which a vehicle is placed. This enables a robust wireless cable testing method and allows measurements to be taken for any antenna system, outside or inside the vehicle.

Figure 7:
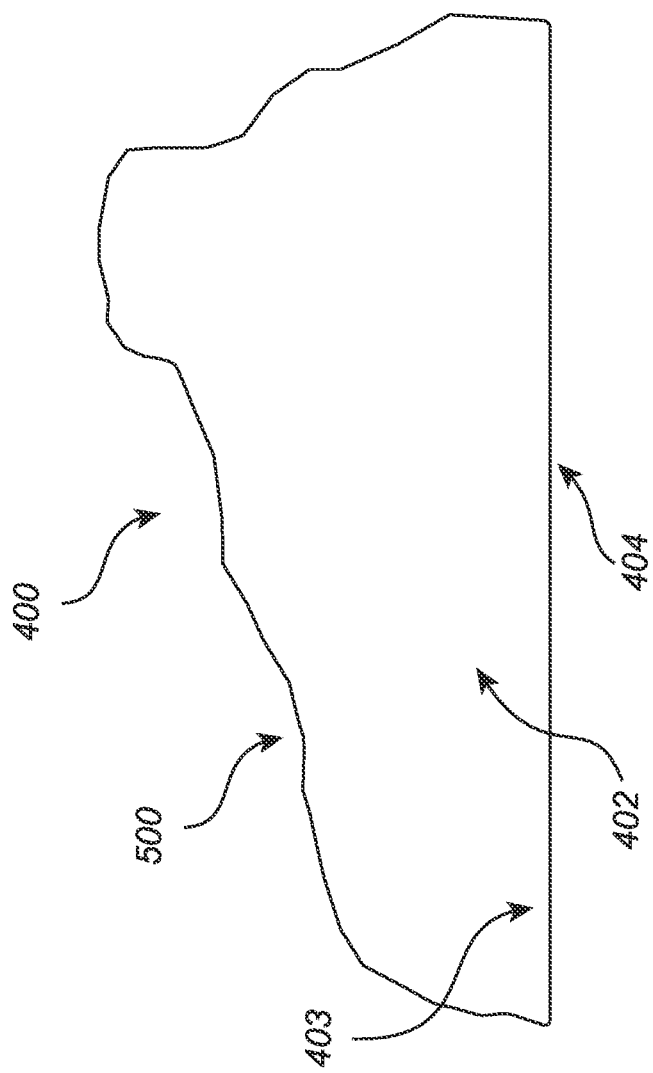
FIG. 7 is a schematic diagram illustrating the wireless cable shielding cover of the present disclosure, utilizing a conductive ground plate and conductive cover that effectively environmentally isolate the vehicle telematics system and vehicle for vehicle telematics system testing and verification.

Referring now specifically to FIG. 7, in one illustrative embodiment, the enhanced vehicle telematics verification system 500 of the present disclosure includes a conductive cover 402 that is draped over all or a portion of a vehicle 400 and a conductive ground plate 404 on which the vehicle 400 is parked or placed. The conductive cover 402 is flexible and is manufactured from a conductive metallic material or the like, such that the conductive cover 402 substantially conforms to the shape of the vehicle 400, antennas, and other components over which the conductive cover 402 is disposed. For example, the conductive cover 402 may be manufactured as a flexible textile or planar structure that includes a conductive metallic layer or is impregnated with a conductive metallic material. The conductive ground plate 404 is also manufactured from conductive metallic material or the like and forms a planar surface (rigid or flexible) on which the vehicle 400 is selectively disposed for testing. A lower portion 403 of the conductive cover 402 preferably makes contact with the conductive ground plate 404 around the periphery of the vehicle 400, thereby forming an environmentally shielded envelope around the vehicle and its antennas and electronic components for vehicle telematics verification testing without outside signal interference. As illustrated, the conductive cover 402 and conductive ground plate 404 encapsulate the entire vehicle 400.

Figure 8:
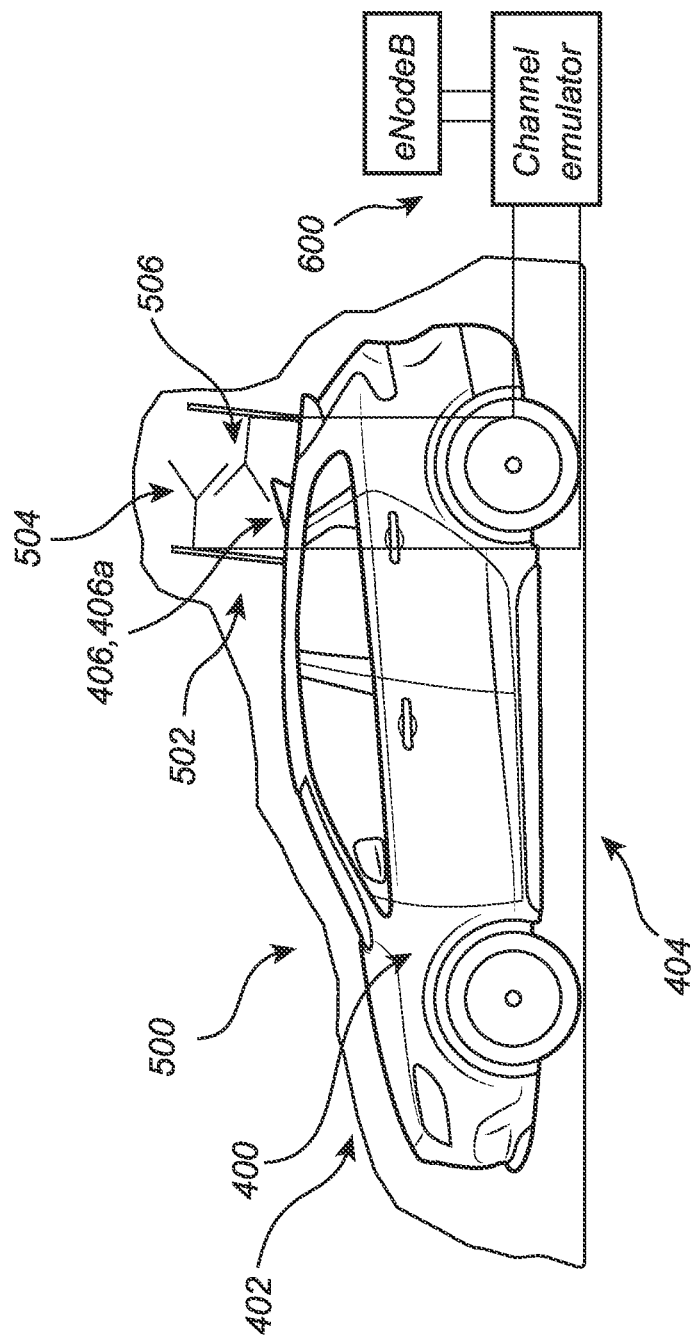
FIG. 8 is another schematic diagram illustrating the wireless cable shielding cover of the present disclosure, utilizing the conductive ground plate and conductive cover that effectively environmentally isolate the vehicle telematics system and vehicle for vehicle telematics system testing and verification, as well as, in a first location, the downlink and uplink antennas described previously.

Referring now specifically to FIG. 8, the conductive cover 402 is preferably disposed over and around the vehicle 400 and a box structure or other fixture structure(s) 502 that is/are disposed over and around or adjacent to the antenna 406 that is to be tested. The box structure or other fixture structure(s) 502 may be made of any suitable metallic or non-metallic material, as shielding is here provided by the conductive cover 402. As before, one or more downlink antennas 504 are provided in the structure 502 or associated with the fixture(s) 502 and is/are adapted to deliver the downlink signal to the antenna 406. Likewise, one or more uplink antennas 506 are provided in the structure 502 or associated with the fixture(s) 502 and is/are adapted to receive the uplink signal from the antenna 406. The structure 502 or fixture(s) 502 are coupled to the exterior surface of the vehicle 400 via one or more magnets, suction connectors, adhesive connectors, bolts, and/or the like. In this manner, the structure 502 or fixture(s) 502 create a void adjacent to the exterior surface of the vehicle 400 in which the downlink antenna(s) 504 and uplink antenna(s) 506 are disposed adjacent to the tested antenna 406, which here is illustrated as a roof antenna 406a. Because the vehicle 400 is disposed entirely under the conductive cover 402, the electronic systems of the vehicle, such as the electronic control unit (ECU) and the like, affect the measurements taken, thereby providing a controlled real-world testing environment. Multiple voids can be utilized and multiple antennas can be tested, thereby allowing for testing of their interaction. Selective isolation can also be provided for specific antennas. The downlink antenna 504 and the uplink antenna 505 are connected to the appropriate electronic testing components 600 as described in detail herein above.

Figure 9:
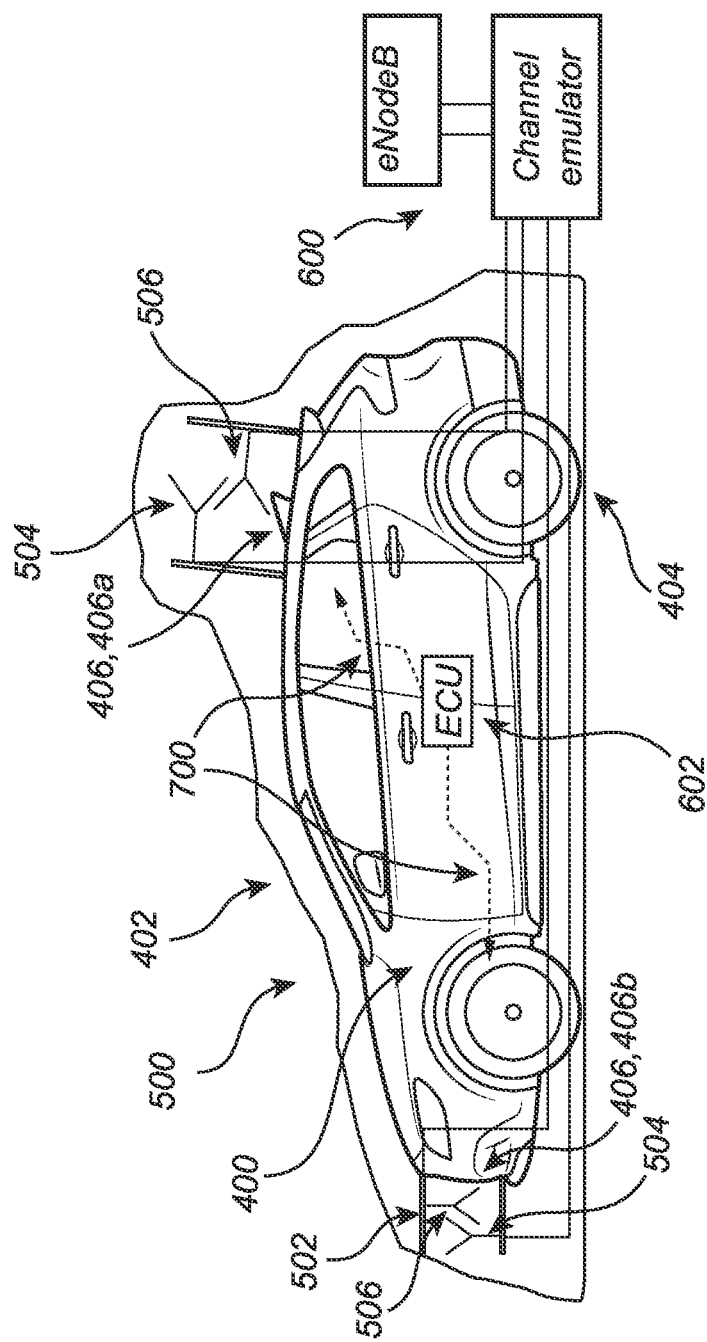
FIG. 9 is a further schematic diagram illustrating the wireless cable shielding cover of the present disclosure, utilizing the conductive ground plate and conductive cover that effectively environmentally isolate the vehicle telematics system and vehicle for vehicle telematics system testing and verification, as well as, in the first location and a second location, the downlink and uplink antennas described previously.

Referring now specifically to FIG. 9, the conductive cover 402 is again preferably disposed over and around the vehicle 400 and a box structure or other fixture structure(s) 502 that is/are disposed over and around or adjacent to the antenna 406 that is to be tested. The box structure or other fixture structure(s) 502 may be made of any suitable metallic or non-metallic material, as shielding is here provided by the conductive cover 402. As before, one or more downlink antennas 504 are provided in the structure 502 or associated with the fixture(s) 502 and is/are adapted to deliver the downlink signal to the antenna 406. Likewise, one or more uplink antennas 506 are provided in the structure 502 or associated with the fixture(s) 502 and is/are adapted to receive the uplink signal from the antenna 406. The structure 502 or fixture(s) 502 are coupled to the exterior surface of the vehicle 400 via one or more magnets, suction connectors, adhesive connectors, bolts, and/or the like. In this manner, the structure 502 or fixture(s) 502 create a void adjacent to the exterior surface of the vehicle 400 in which the downlink antenna(s) 504 and uplink antenna(s) 506 are disposed adjacent to the tested antenna 406, which here is illustrated as a roof antenna 406a, as well as a front bumper antenna 406b. Because the vehicle 400 is disposed entirely under the conductive cover 402, the electronic systems of the vehicle, such as the ECU 602 and the like, affect the measurements taken, thereby providing a controlled real-world testing environment. As illustrated here, multiple voids can be utilized and multiple antennas can be tested, thereby allowing for testing of their interaction 700. Selective isolation can also be provided for specific antennas. The downlink antenna 504 and the uplink antenna 505 are connected to the appropriate electronic testing components 600 as described in detail herein above. It should be noted that the downlink antenna(s) 504 and uplink antenna(s) 506 may be placed freely in proximity to the antenna(s) 406 under the conductive cover 402, either alone, coupled to the box structure or other fixture structure(s) 502, within the box structure 502, between adjacent fixture structures 502, etc. This provides a great deal of placement flexibility.

Figure 10:
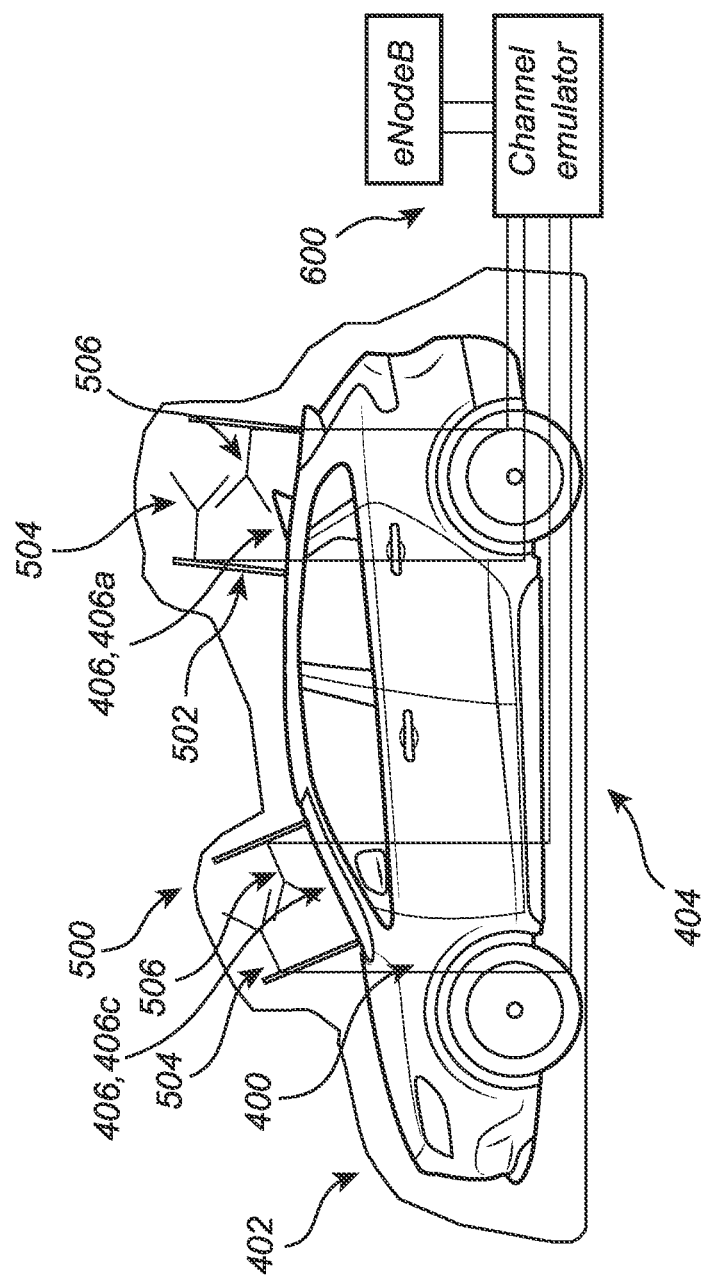
FIG. 10 is a further schematic diagram illustrating the wireless cable shielding cover of the present disclosure, utilizing the conductive ground plate and conductive cover that effectively environmentally isolate the vehicle telematics system and vehicle for vehicle telematics system testing and verification, as well as, in the first location and a third location, the downlink and uplink antennas described previously.

Referring now specifically to FIG. 10, the conductive cover 402 is again preferably disposed over and around the vehicle 400 and a box structure or other fixture structure(s) 502 that is/are disposed over and around or adjacent to the antenna 406 that is to be tested. The box structure or other fixture structure(s) 502 may be made of any suitable metallic or non-metallic material, as shielding is here provided by the conductive cover 402. As before, one or more downlink antennas 504 are provided in the structure 502 or associated with the fixture(s) 502 and is/are adapted to deliver the downlink signal to the antenna 406. Likewise, one or more uplink antennas 506 are provided in the structure 502 or associated with the fixture(s) 502 and is/are adapted to receive the uplink signal from the antenna 406. The structure 502 or fixture(s) 502 are coupled to the exterior surface of the vehicle 400 via one or more magnets, suction connectors, adhesive connectors, bolts, and/or the like. In this manner, the structure 502 or fixture(s) 502 create a void adjacent to the exterior surface of the vehicle 400 in which the downlink antenna(s) 504 and uplink antenna(s) 506 are disposed adjacent to the tested antenna 406, which here is illustrated as a roof antenna 406a, as well as a front windshield antenna 406c. Because the vehicle 400 is disposed entirely under the conductive cover 402, the electronic systems of the vehicle, such as the ECU and the like, affect the measurements taken, thereby providing a controlled real-world testing environment. As illustrated here, multiple voids can be utilized and multiple antennas can be tested, thereby allowing for testing of their interaction. Selective isolation can also be provided for specific antennas. The downlink antenna 504 and the uplink antenna 505 are connected to the appropriate electronic testing components 600 as described in detail herein above. It should be noted that the same downlink signal(s) can be provided to each antenna, or different downlink signals can be provided to each antenna.

Thus, because the entire vehicle and ground are conductively covered, improved shielding results. Distributed antennas can be simultaneously measure using multiple boxes or fixtures under the conductive cover. Further, through the use of fixtures, antennas that are integrated into areas where a box cannot be placed may be measured. Interference from other vehicle electronic components is included in the measurements obtained. The flexible cover is adaptable and cost effective during vehicle and vehicle telematics development, in a workshop for fault tracing, and during production testing.

Figure 11:
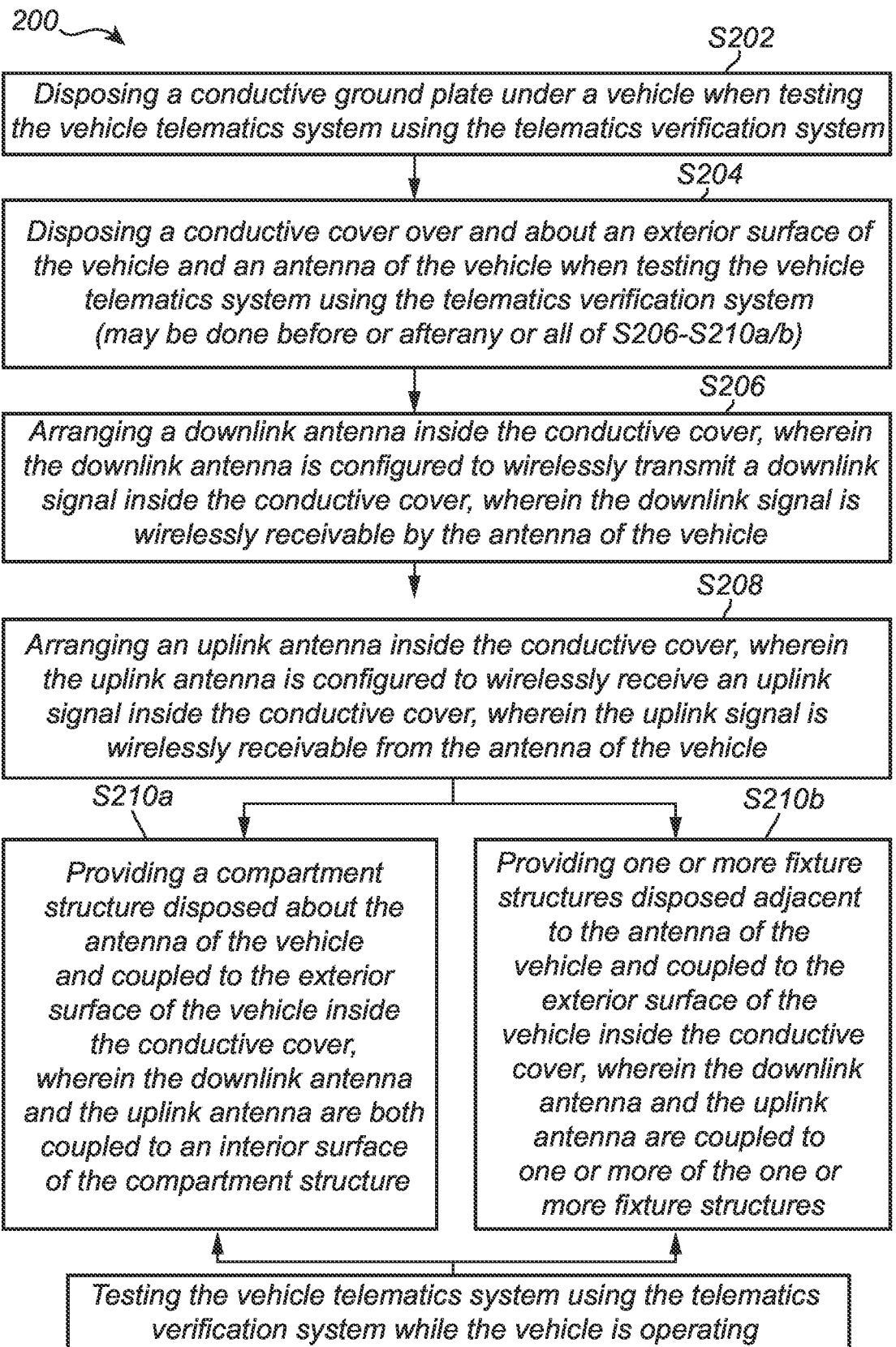
FIG. 11 is a flowchart illustrating the wireless cable shielding method of the present disclosure, utilizing a conductive ground plate and conductive cover that effectively environmentally isolate the vehicle telematics system and vehicle for vehicle telematics system testing and verification.

Referring now specifically to FIG. 11, in a further illustrative embodiment, the present disclosure provides a telematics verification method 200 for the testing of a vehicle telematics system, the telematics verification method 200 including: disposing a conductive ground plate under a vehicle when testing the vehicle telematics system using the telematics verification system (S202); disposing a conductive cover over and about an exterior surface of the vehicle and an antenna of the vehicle when testing the vehicle telematics system using the telematics verification system (S204) (this step may be performed before or after any or all of S206-S210a/b); arranging a downlink antenna inside the conductive cover, wherein the downlink antenna is configured to wirelessly transmit a downlink signal inside the conductive cover, wherein the downlink signal is wirelessly receivable by the antenna of the vehicle (S206); and arranging an uplink antenna inside the conductive cover, wherein the uplink antenna is configured to wirelessly receive an uplink signal inside the conductive cover, wherein the uplink signal is wirelessly receivable from the antenna of the vehicle (S208). The conductive cover is manufactured from a flexible material such that the conductive cover conforms to the exterior surface of the vehicle and one or more of the antenna of the vehicle, the downlink antenna, the uplink antenna, and a support structure coupled to one or more of the uplink antenna and the downlink antenna. A lower portion of the conductive cover makes contact with an upper surface of the conductive ground plate around an external periphery of the vehicle. Optionally, the telematics verification method further includes providing a compartment structure disposed about the antenna of the vehicle and coupled to the exterior surface of the vehicle inside the conductive cover, wherein the downlink antenna and the uplink antenna are both coupled to an interior surface of the compartment structure (S210a). Alternatively, the telematics verification method further includes providing one or more fixture structures disposed adjacent to the antenna of the vehicle and coupled to the exterior surface of the vehicle inside the conductive cover, wherein the downlink antenna and the uplink antenna are coupled to one or more of the one or more fixture structures (S210b). The telematics verification method further includes testing the vehicle telematics system using the telematics verification system while the vehicle is operating (S212).

The person skilled in the art realizes that the present disclosure by no means is limited to the illustrative embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

What is claimed is:

1. A telematics verification system for the testing of a vehicle telematics system, the telematics verification system comprising:
    a conductive ground plate adapted to be disposed under a vehicle when testing the vehicle telematics system using the telematics verification system;
    a conductive cover adapted to be disposed over and about an exterior surface of the vehicle and an antenna of the vehicle when testing the vehicle telematics system using the telematics verification system;
    a downlink antenna adapted to be arranged inside the conductive cover, wherein the downlink antenna is configured to wirelessly transmit a downlink signal inside the conductive cover, wherein the downlink signal is wirelessly receivable by the antenna of the vehicle; and
    an uplink antenna adapted to be arranged inside the conductive cover, wherein the uplink antenna is configured to wirelessly receive an uplink signal inside the conductive cover, wherein the uplink signal is wirelessly receivable from the antenna of the vehicle.

2. The telematics verification system of claim 1, wherein the conductive cover is manufactured from a flexible material such that the conductive cover conforms to the exterior surface of the vehicle and one or more of the antenna of the vehicle, the downlink antenna, the uplink antenna, and a support structure coupled to one or more of the uplink antenna and the downlink antenna.

3. The telematics verification system of claim 1, wherein a lower portion of the conductive cover makes contact with an upper surface of the conductive ground plate around an external periphery of the vehicle.

4. The telematics verification system of claim 1, further comprising a compartment structure disposed about the antenna of the vehicle and coupled to the exterior surface of the vehicle inside the conductive cover, wherein the downlink antenna and the uplink antenna are both coupled to an interior surface of the compartment structure.

5. The telematics verification system of claim 1, further comprising one or more fixture structures disposed adjacent to the antenna of the vehicle and coupled to the exterior surface of the vehicle inside the conductive cover, wherein the downlink antenna and the uplink antenna are coupled to one or more of the one or more fixture structures.

6. The telematics verification system of claim 1, wherein an additional antenna of the vehicle is disposed inside the conductive cover when testing the vehicle telematics system using the telematics verification system, and wherein the telematics verification system further comprises:
   an additional downlink antenna adapted to be arranged inside the conductive cover, wherein the additional downlink antenna is configured to wirelessly transmit an additional downlink signal inside the conductive cover, wherein the additional downlink signal is wirelessly receivable by the additional antenna of the vehicle; and
   an additional uplink antenna adapted to be arranged inside the conductive cover, wherein the additional uplink antenna is configured to wirelessly receive an additional uplink signal inside the conductive cover, wherein the additional uplink signal is wirelessly receivable from the additional antenna of the vehicle.

7. The telematics verification system of claim 1, wherein the conductive ground plate is adapted to be disposed under the vehicle and the conductive cover is adapted to be disposed over and about the exterior surface of the vehicle and the antenna of the vehicle when testing the vehicle telematics system using the telematics verification system while the vehicle is operating.

8. A telematics verification system for the testing of a vehicle telematics system, the telematics verification system comprising:
   a conductive ground plate adapted to be disposed under a vehicle when testing the vehicle telematics system using the telematics verification system;
   a conductive cover adapted to be disposed over and about an exterior surface of the vehicle and an antenna of the vehicle when testing the vehicle telematics system using the telematics verification system;
   a downlink antenna adapted to be arranged inside the conductive cover, wherein the downlink antenna is configured to wirelessly transmit a downlink signal inside the conductive cover, wherein the downlink signal is wirelessly receivable by the antenna of the vehicle;
   an uplink antenna adapted to be arranged inside the conductive cover, wherein the uplink antenna is configured to wirelessly receive an uplink signal inside the conductive cover, wherein the uplink signal is wirelessly receivable from the antenna of the vehicle; and
   a support structure adapted to be arranged inside the conductive cover, wherein the downlink antenna and the uplink antenna are both coupled to the support structure.

9. The telematics verification system of claim 8, wherein the conductive cover is manufactured from a flexible material such that the conductive cover conforms to the exterior surface of the vehicle and one or more of the antenna of the vehicle, the downlink antenna, the uplink antenna, and the support structure coupled to the uplink antenna and the downlink antenna.

10. The telematics verification system of claim 8, wherein a lower portion of the conductive cover makes contact with an upper surface of the conductive ground plate around an external periphery of the vehicle.

11. The telematics verification system of claim 8, further wherein the support structure comprises a compartment structure disposed about the antenna of the vehicle and coupled to the exterior surface of the vehicle inside the conductive cover, wherein the downlink antenna and the uplink antenna are both coupled to an interior surface of the compartment structure.

12. The telematics verification system of claim 8, wherein the support structure comprises one or more fixture structures disposed adjacent to the antenna of the vehicle and coupled to the exterior surface of the vehicle inside the conductive cover, wherein the downlink antenna and the uplink antenna are coupled to one or more of the one or more fixture structures.

13. The telematics verification system of claim 8, wherein an additional antenna of the vehicle is disposed inside the conductive cover when testing the vehicle telematics system using the telematics verification system, and wherein the telematics verification system further comprises:
   an additional downlink antenna adapted to be arranged inside the conductive cover, wherein the additional downlink antenna is configured to wirelessly transmit an additional downlink signal inside the conductive cover, wherein the additional downlink signal is wirelessly receivable by the additional antenna of the vehicle; and
   an additional uplink antenna adapted to be arranged inside the conductive cover, wherein the additional uplink antenna is configured to wirelessly receive an additional uplink signal inside the conductive cover, wherein the additional uplink signal is wirelessly receivable from the additional antenna of the vehicle.

14. The telematics verification system of claim 8, wherein the conductive ground plate is adapted to be disposed under the vehicle and the conductive cover is adapted to be disposed over and about the exterior surface of the vehicle and the antenna of the vehicle when testing the vehicle telematics system using the telematics verification system while the vehicle is operating.

15. A telematics verification method for the testing of a vehicle telematics system, the telematics verification method comprising:
   disposing a conductive ground plate under a vehicle when testing the vehicle telematics system using the telematics verification system;
   disposing a conductive cover over and about an exterior surface of the vehicle and an antenna of the vehicle when testing the vehicle telematics system using the telematics verification system;
   arranging a downlink antenna inside the conductive cover, wherein the downlink antenna is configured to wirelessly transmit a downlink signal inside the conductive cover, wherein the downlink signal is wirelessly receivable by the antenna of the vehicle; and
   arranging an uplink antenna inside the conductive cover, wherein the uplink antenna is configured to wirelessly receive an uplink signal inside the conductive cover, wherein the uplink signal is wirelessly receivable from the antenna of the vehicle.

16. The telematics verification method of claim 15, wherein the conductive cover is manufactured from a flexible material such that the conductive cover conforms to the exterior surface of the vehicle and one or more of the antenna of the vehicle, the downlink antenna, the uplink antenna, and a support structure coupled to one or more of the uplink antenna and the downlink antenna.

17. The telematics verification method of claim 15, wherein a lower portion of the conductive cover makes contact with an upper surface of the conductive ground plate around an external periphery of the vehicle.

18. The telematics verification method of claim 15, further comprising providing a compartment structure disposed about the antenna of the vehicle and coupled to the exterior surface of the vehicle inside the conductive cover, wherein the downlink antenna and the uplink antenna are both coupled to an interior surface of the compartment structure.

19. The telematics verification method of claim 15, further comprising providing one or more fixture structures disposed adjacent to the antenna of the vehicle and coupled to the exterior surface of the vehicle inside the conductive cover, wherein the downlink antenna and the uplink antenna are coupled to one or more of the one or more fixture structures.

20. The telematics verification method of claim 15, further comprising testing the vehicle telematics system using the telematics verification system while the vehicle is operating.

\* \* \* \* \*